United States Patent [19]

Frisz

[11] Patent Number: 4,551,066

[45] Date of Patent: Nov. 5, 1985

[54] SUBMERGED WATER WHEEL

[76] Inventor: James O. Frisz, 921 Pear St., Brea, Calif. 92621

[21] Appl. No.: 473,001

[22] Filed: Mar. 7, 1983

[51] Int. Cl.[4] .......................... F03D 7/06; F03B 7/00

[52] U.S. Cl. .................................. 416/119; 416/140; 416/41

[58] Field of Search .................................. 416/84–86, 416/111, 119, 140 R, 41 R

[56] References Cited

U.S. PATENT DOCUMENTS

| | | | |
|---|---|---|---|
| 1,017,409 | 2/1912 | Granger | 416/86 |
| 1,582,361 | 4/1926 | Welsch | 416/DIG. 8 X |
| 4,052,134 | 10/1977 | Rumsey | 416/140 R X |
| 4,365,934 | 12/1982 | Mason | 416/197 A X |
| 4,368,392 | 1/1983 | Drees | 416/DIG. 8 X |
| 4,378,198 | 3/1983 | Pettersson | 416/140 R |

FOREIGN PATENT DOCUMENTS

| | | | |
|---|---|---|---|
| 1118687 | 2/1982 | Canada | 416/140 R |
| 2426813 | 1/1980 | France | 416/140 R |
| 2500076 | 8/1982 | France | 416/117 |
| 14870 | 2/1981 | Japan | 416/119 |
| 301091 | 12/1930 | United Kingdom | 416/119 |
| 709201 | 5/1954 | United Kingdom | 416/119 |

*Primary Examiner*—Everette A. Powell, Jr.

[57] ABSTRACT

A water wheel for operating fully submerged in an ocean current has a rotating frame member supported on the ocean floor for rotation about a vertical axis. The frame member supports a plurality of vertically extending vanes, each vane being rotatably supported on the frame for limited rotation about a vertical axis. It has a hydrofoil shape in cross-section with the axis of rotation parallel to the leading and trailing edges. Rotation of the vanes is limited relative to the frame by a hydraulic piston control system and shock absorbers.

1 Claim, 3 Drawing Figures

SUBMERGED WATER WHEEL

FIELD OF THE INVENTION

This invention relates to fully submerged water wheels, and more particularly, is concerned with a submerged water wheel which is continuously rotated about a vertical axis by water flowing horizontally through the wheel from any direction.

BACKGROUND OF THE INVENTION

With the growing political and environmental problems associated with the use of conventional fossil fuels, there has been an increased interest in alternate sources of energy which are both economical and do not have a serious environmental impact. Water power has long been recognized as a major source of power, but the damming and impounding of water of our major rivers has already been exploited to a substantial degree. Also the impounding of water itself has an impact on the surrounding countryside and interferes with navigation on the rivers.

The ebb flow of tides has been suggested as another source of energy but to utilize the tides also requires the impounding of water in order to obtain a continuous source of power from the cyclic action of the tides.

One source of energy which has not been utilized is the major currents which are found in the ocean, such as the Japanese current in the Pacific and the Gulf Stream in the Atlantic. The continuous flow of large volumes of water which are present in these currents represents a fast source of continuous energy which to date remains untapped.

SUMMARY OF THE INVENTION

The present invention is directed to a water wheel which can be mounted on the ocean floor and which is rotated by the moving current. The water wheel is completely submerged at a rather substantial depth so as not to present any hazard to navigation. The water wheel is designed to provide high efficiency regardless of the direction of flow of the current. The water wheel can be made with void areas which can be partially flooded to change the buoyancy of the water wheel, permitting it to be made to very large dimensions. This permits the water wheel unit to be floated to the location where the void areas are partially flooded to lower the water wheel unit to the ocean floor. The water wheel can be made of concrete or other suiable materials, giving it great durability and relatively low cost.

These features are achieved by providing a water wheel apparatus comprising a large rotating frame which is supported on a vertical shaft member that is suitably anchored to the ocean floor. A plurality of vertical vanes are circumferentially spaced around the axis of rotation of the frame, each vane being rotatable about its own vertical axis. The vanes have a hydrofoil shape which permits them to generate a positive torque on the frame even when they are moving against the flow of current as they move around the axis of rotation of the frame. Means is provided for limiting the rotation of the vanes on their individual axis by an amount less than 360°.

DESCRIPTION OF THE DRAWINGS

For a more complete understanding of the invention reference should be made to the accompanying drawings, wherein.

DETAILED DESCRIPTION

Figure 1:
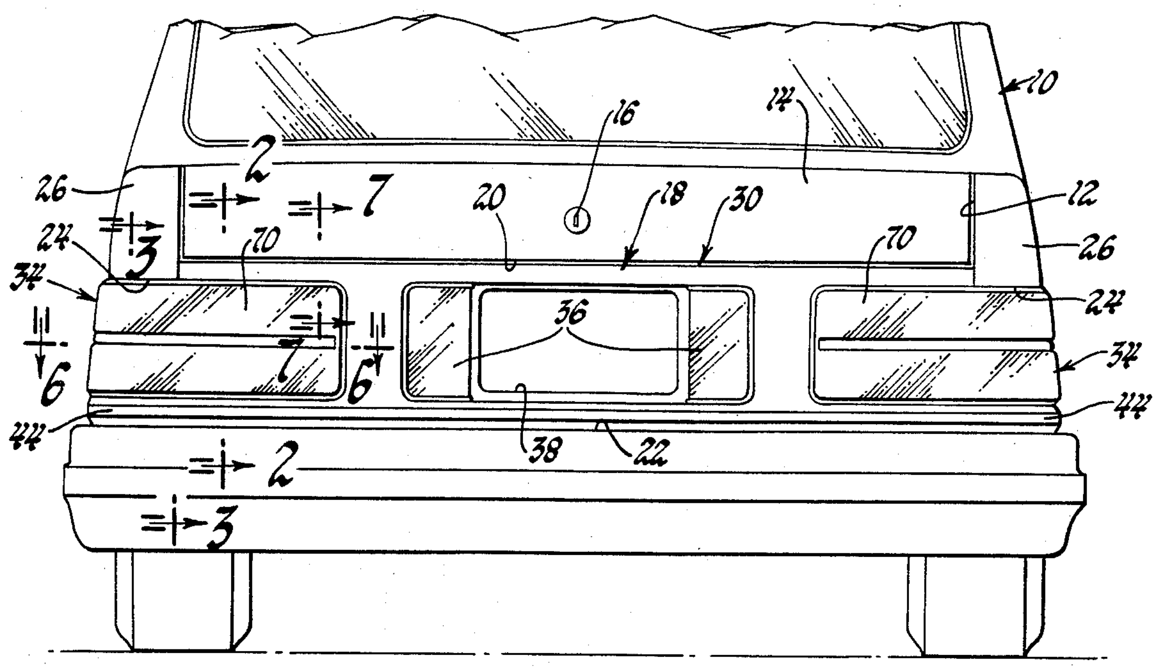
FIG. 1 is a cross-sectional view in elevation of the water wheel.

Referring to the drawings in detail, the numeral 10 indicates generally a central shaft having a mounting portion 12 which is anchored to the sea floor in any suitable manner. The upper end of the base portion 12 terminates in a tapered or conical shoulder 14 and smaller diameter shaft portion 16. A water wheel, indicated generally at 18, is journaled on the shaft 16 for rotation about a vertical axis.

The water wheel 18 includes a lower disk shaped member 20 having a central opening 22 for receiving the shaft 16. The central opening 22 includes a conically shaped section 24 which engages the tapered shoulder 14. The disk member 20 is preferably constructed from reinforced concrete, the central opening being formed by a metal sleeve 26. The shoulder 14 is preferably provided with a plurality of bearing inserts of nylon or other suitable bearing material, indicated at 28, which is lubricated by the sea water and provides a bearing surface for the insert sleeve 26. Thus a bearing is provided which receives both the axial downward thrust of the water wheel as well as providing radial centering of the water wheel.

Mounted on top of the disk member 20 is a central hub 30 which is flared outwardly at its lower and upper ends. The lower end of the hub 30 has a plurality of downwardly projecting pads 32 which fit into recesses in the top surface of the disk member 20 to lock the hub 30 and disk member 20 against relative rotation. The upper end of the hub 30 similarly engages an upper disk shape member 34 by means of projecting pads 36.

The upper disk member 34 has a central opening 38 for receiving the shaft 16. The opening 38 is formed by a metal sleeve 40 having a conically shaped portion 42 flaring outwardly towards the upper surface of the disk 34. A conically shaped collar 44 is fitted onto the upper end of the shaft 16 and is provided with a plurality of inserts 46 of nylon or other suitable bearing material which slidably engage the conical section 42 to provide a bearing for the upper disk member 34. Thus the lower disk 20, upper disk 34, and hub 30, when assembled, form a unitary rotating frame structure for the water wheel which is journaled for rotation on the stationary shaft assembly 10.

The upper and lower disks and the hub are cast with suitable void spaces which serve as buoyancy chambers, such as indicated at 50 in the lower disk 20, at 52 in the hub, and at 54 in the upper disk member 34. While not shown, it will be understood that these chambers may be provided with suitable external valve connections by which they can be flooded for ballast or filled with air under pressure to remove the water. The ballast chambers, when filled with air, permit the individual sections to be floated to the installation location. The chambers can then be partially flooded to lower the sections onto the shaft 10, starting with the lower disk member 20 followed by the hub 30, and finally the upper disk member 34, after which the collar 44 is secured to the upper end of the shaft portion 16. The ballast can then be adjusted by means of the ballast chambers so that the assembly has substantial neutral buoyancy.

Figure 2:
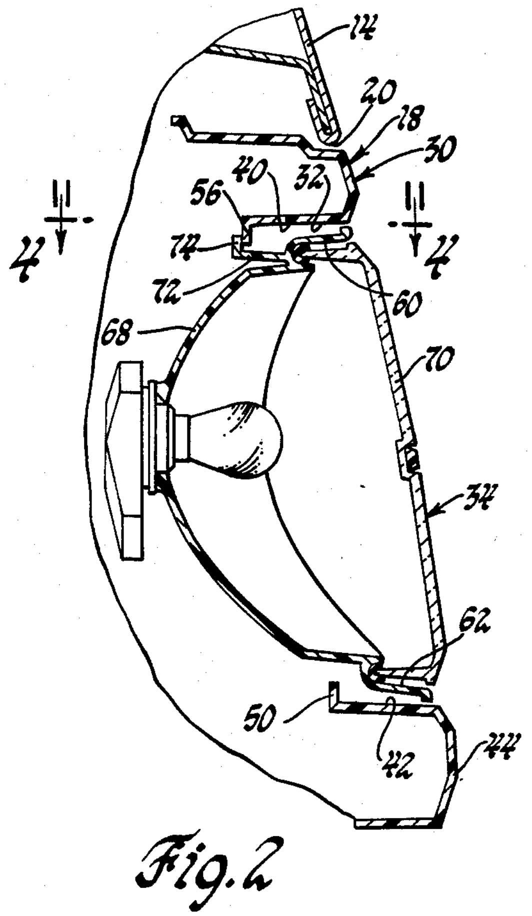
FIG. 2 is a sectional view taken on the line 2—2 of FIG. 1.

A plurality of vertically extending shafts 56 project upwardly from the lower disk member 20 at circumferentially spaced positions around the outer periphery of the disk. There are eight such shafts 56 shown by way of example. The shafts 56 may be cast integrally with the lower disks or otherwise anchored at their lower ends in the disk member 20. The upper ends of the shafts 56 fit into aligned holes in the upper disk 34 when the disk member 34 is lowered onto the hub 30. Each of the shafts 56 serves as a journal for a vane or sea foil member 58. As seen in FIG. 2, in cross-section, the vanes 58 have a hydrofoil shape with a leading edge 60 and trailing edge 62. The widest portion has a hole 64 through which the shaft 56 extends. The widest portion of the foil section is typically one-third of the distance between the leading and trailing edges.

The lower end of the opening 64 through each vane is flared outwardly to receive a tapered shoulder 66 on the shaft 56. Again suitable nylon inserts or the like may be used to provide bearing support for rotation of the vane. The upper end of the opening 64 is similarly flared to receive a sleeve 68 which is secured to the upper end of the shaft 56 and provides a tapered bearing surface 70. Thus each of the vanes is arranged to rotate about its own supporting shaft 56.

Each of the vanes may be cast from ferro cement, reinforced concrete, steel, or other suitable materials and preferably is provided with void spaces forming ballast chambers, indicated at 72. Again provision may be made for admitting water or pumping air under pressure into the ballast chanmbers to control the buoyancy of the vanes, permitting them to be floated to location, lowered into position, and then adjusted to provide substantial neutral buoyancy during operation.

Operation of the water wheel can best be understood by reference to FIG. 2. Each vane is provided with at least one cylinder and piston assembly 76, one end of which is pivotally anchored to a disk member, as indicated at 78. The other end is pivotally secured to an associated vane 58. When fully extended, the piston and cylinder assembly limits rotation of the vane to a position in which the leading edge 60 and trailing edge 62 lie in a radial plane with the leading edge 60 being outboard of the shaft 56. A stop member 80 adjacent the trailing edge 63 may be mounted on the lower disk member 20 in position to engage the vane 58 when it rotates into this position to relieve the limiting load from the cylinder and piston assembly 76. Each of the vanes is free to rotate from this limiting position in a clockwise direction, as viewed in FIG. 2, through an angle of approximately 135° to a second limiting position in which the cylinder and piston assembly 76 is fully retracted. A stop 79 limits rotation of the vane 58 in the second position.

Figure 3:
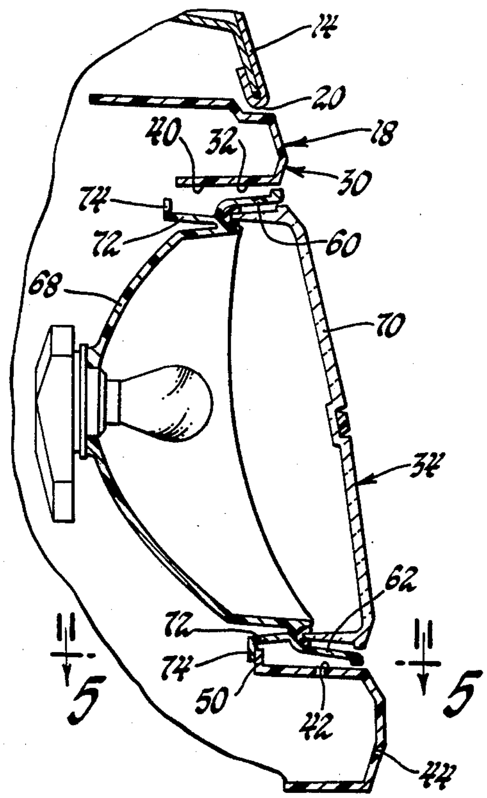
FIG. 3 is a schematic showing of a piston control system.
Figure 4:
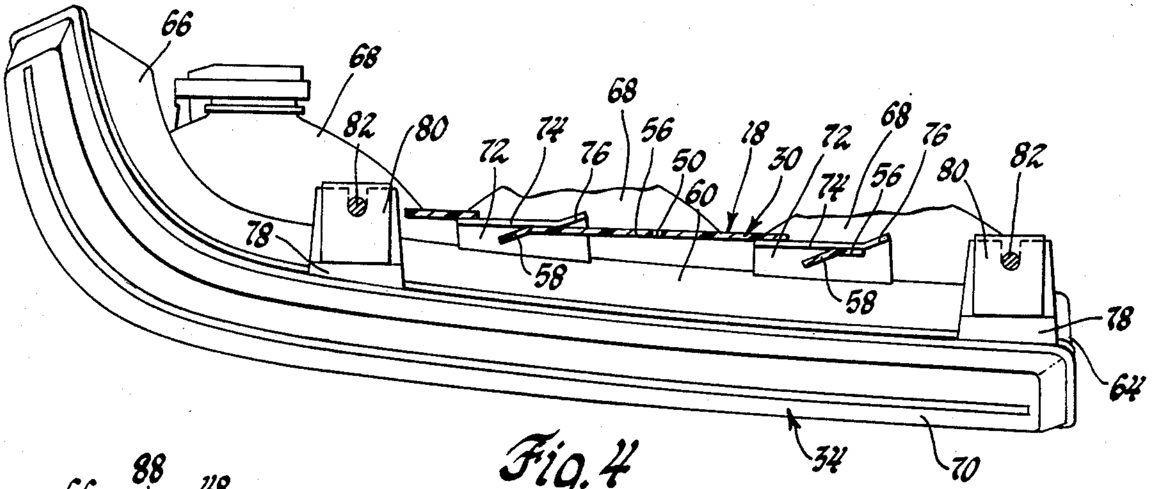
Figure 5:
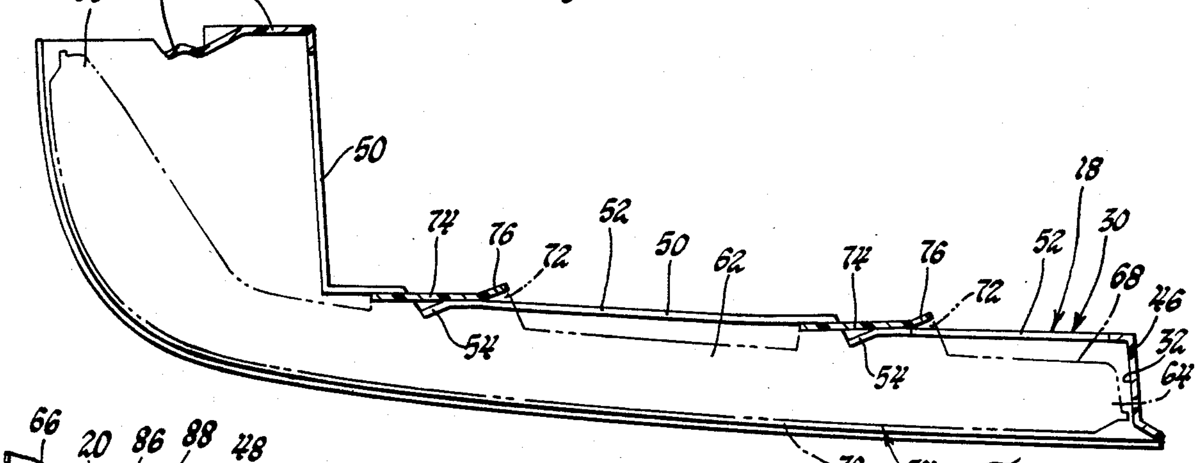
Figure 6:
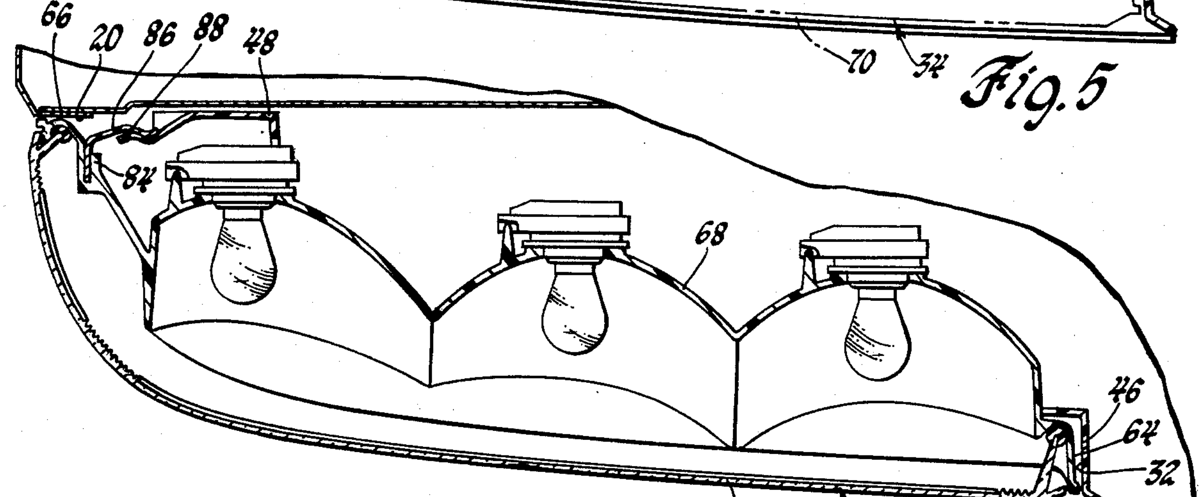
Figure 7:
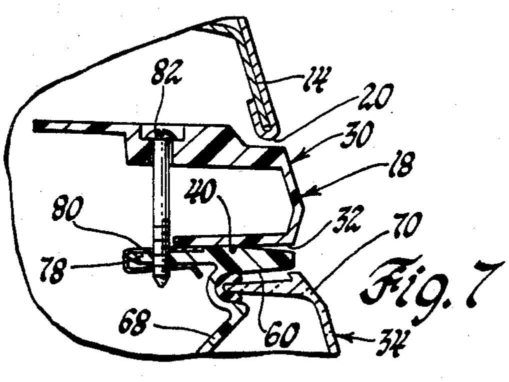
Figure 8:
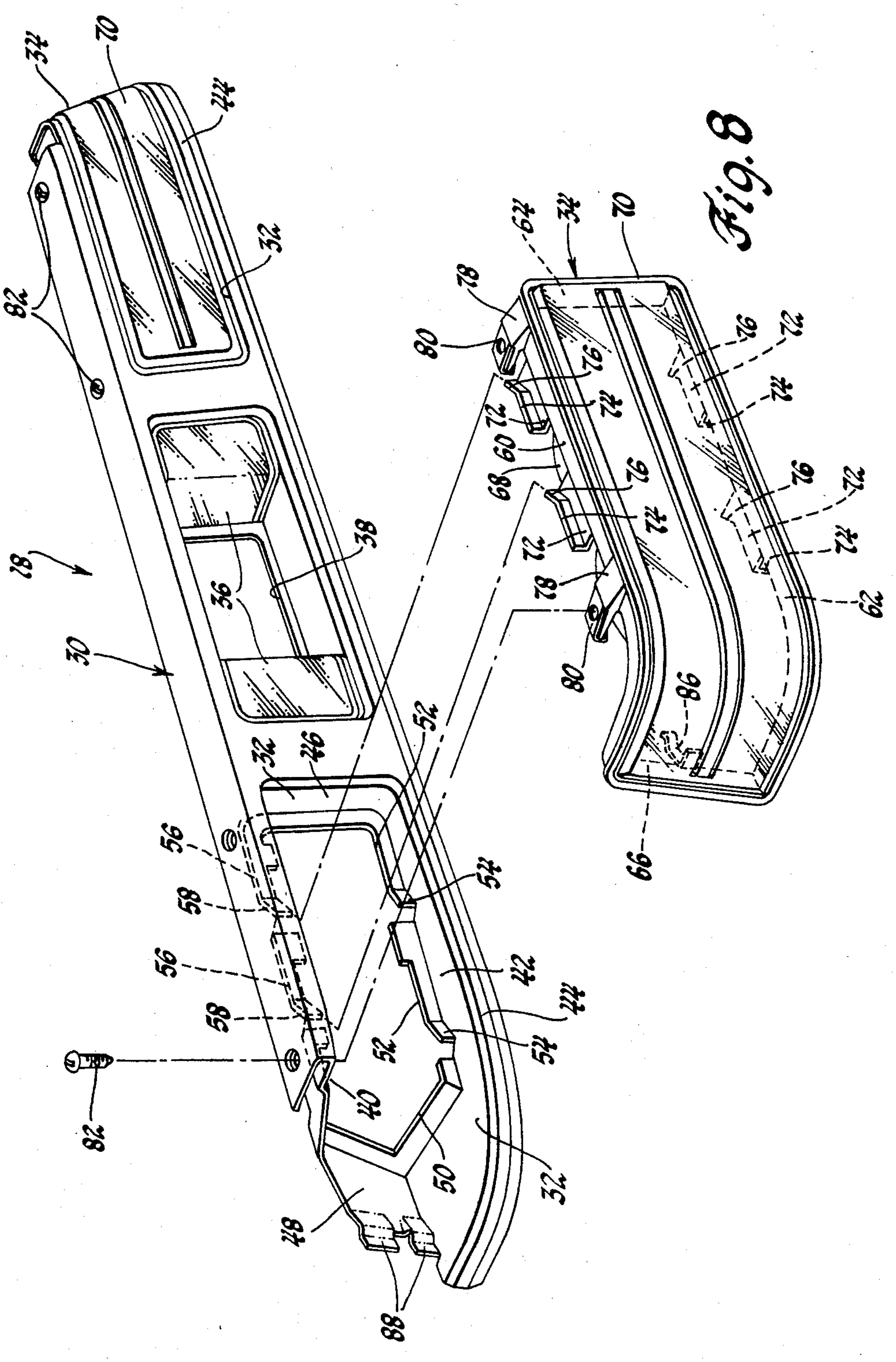
Figure 1:
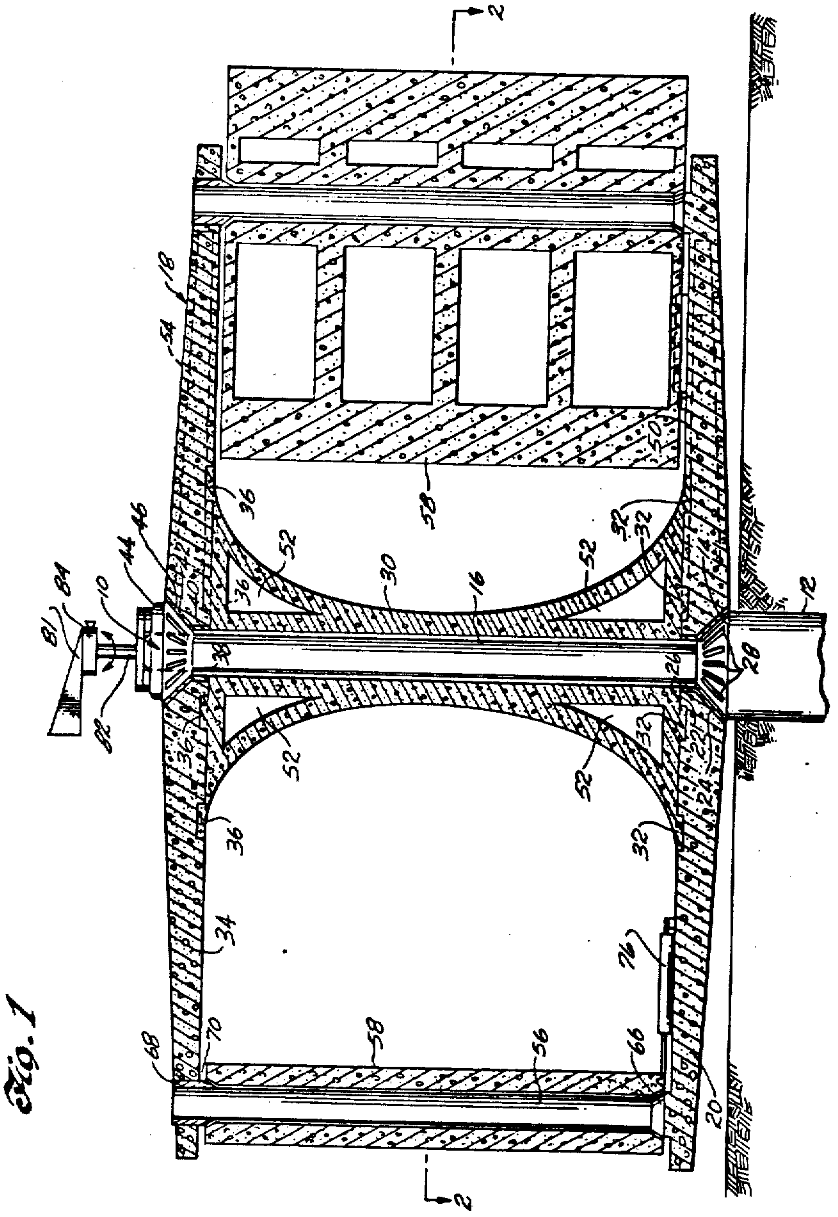

In addition to limiting the angle of rotation of the vanes on the respective shafts 56, the cylinder and piston assembly 76 can be adjusted automatically by the velocity of the flow to control the rate at which the vanes rotate by controlling the rate at which fluid is forced in or out of the cylinder by the moving piston. The cylinder and piston assemblies preferably restrict rotation of the vanes only in a counterclockwise direction. As shown in FIG. 3, a small vane 81 is mounted for rotation about the vertical axis of a supporting shaft 82 projecting above the water wheel. A suitable flow velocity meter 84 is also supported on the shaft 82, the vane 81 operating to always direct the meter into the current. The meter 84, through a control unit 86, operates throttle valves 88 connected in by-pass lines 90 extending between opposite ends of each piston and cylinder 76. As the rate of flow increases, each of the valves 88 is opened further, thereby decreasing the damping rate of the piston and cylinder. In this manner, the rate of rotation of the vanes 58 is always matched to the rate of rotation of the water wheel as the velocity of the water current changes. Note the piston may have a ball check valve 92 to relieve the pressure on the return stroke. Alternatively, the control for the vanes may utilize a tachometer or similar device for sensing the rate of rotation of the main water wheel assembly 18 relative to the shaft 16, the output of the tachometer being coupled to the input to the valve control unit 86.

Considering the operation in detail, assume that the whater wheel is located in a body of moving water in which the direction of current flow is from right to left, as viewed in FIG. 2. At the top of 0° position, the symmetry of hydrofoil causes the vane to assume a position in which the leading edge 60 is pointing directly upstream into the flow. Thus the vane offers minimum resistance to the flow of the water past the vane. At the 180° position, however, the vane is moved by the force of the water against the stop 80 so that the maximum area extends perpendicular to the direction of flow. Thus a net torque is produced tending to turn the water wheel 18 in a clockwise direction.

The cylinder and piston assembly 76 are arranged to resist the rotation of the vane in a counterclockwise direction on the respective shafts 56. The vanes in moving from the 0° position to the 180° position are restrained so as to rotate at a substantially uniform rate through 90° relative to direction of fluid flow in the time that the frame assembly 18 rotates through 180° relative to its supporting shaft. Thus at the 45° position of the frame assembly, the vane assumes an angle of approximately 22½ relative to the direction of flow of fluid. At the 90° position of the frame, the vane is at 45° to the direction of flow of the fluid. At the 135° position, the vane is 77° to the direction of flow of fluid, while at the 180° position the vane is 90° to the direction of flow of the fluid. Without the restraining effect of the cylinder and position assembly 76, the vanes would tend to move against the stop 80 shortly after passing the 90° position. The advantage of this arrangement is that the flow of water over the hydrofoil surfaces of the vanes when held at an angle to the direction of flow produces a net force in a direction transverse to the direction of fluid flow, thereby producing an effective torque tending to rotate the frame assembly in the clockwise direction through a substantial portion of the 180° rotation from the 0° to the 180° position.

Moving beyond the 180° position, the trailing edge of the vane continues to be pressed against the stop 80 substantially to near the 270° position. At this point, the flow of fluid against the surface of the vane adjacent the stop exceeds the pressure of the fluid on the opposite surface of the vane and, due to the off-center location of the axis of rotation of the vane, the trailing edge 62 is rotated about through an angle of 135° in a clockwise direction, where it is prevented from further rotation by the associated cylinder and piston assembly 76, which is now in a fully retracted condition. This clockwise rotation is not restrained by the cylinder and piston assembly, so that it takes place within a relatively few degrees of rotation of the water wheel 18.

As the frame assembly continues to rotate from the 270° position back to the 0° position, the cylinder and piston assembly 76 again restricts the rate of rotation with counterclockwise direction, so that the vane rotates through 45° while the frame assembly rotates through 90°. Thus it will be seen that a net torque is exerted by the flow of fluid against the vanes as they move from the 180° position back to the 0° position. Therefore in every position except the 0° position each vane is continuously applying a torque to the rotating frame assembly in a clockwise direction in reaction to the flow of water through the water wheel.

From the above description it will be seen that a highly efficient device for converting energy from a moving body of water to a mechanically rotating system is provided. Any suitable means may be provided for extracting energy from the mechanically rotating system. For example, an alternator may be coupled to the water wheel assembly to generate electricity. The particular manner in which power is extracted from the rotating system is not material to the invention and will vary according to the needs of the user.

What is claimed is:

1. Turbine apparatus within a large moving stream of water such as an ocean current for extracting energy from the moving stream, comprising:

a rotating frame member including a ballast chamber;

means supporting the rotating frame member for rotation about an axis;

a plurality of vanes with included ballast chambers;

means rotatably mounting the vanes on the frames at angularly spaced intervals around the axis of rotation of the frame member, each vane rotating about an axis parallel to the axis of rotation of the frame member with said vanes being laterally supported along their full respective axes of rotation;

each vane further having elongated closely spaced major outer surfaces extending parallel to and lengthwise of the axis of rotation of the vane, the major surfaces of each vane being curved slightly and intersecting in leading and trailing edges that are parallel to the axis of rotation of the vanes, said vanes also having a cross-sectional foil shape with the maximum width being closer to said leading edge, with the axis of rotation of each vane being positioned at the widest part of the foil and at a point approximately one-third from the leading edge of the vane to its trailing edge;

stop means limiting the rotation of the respective vanes between first and second angular positions, the vanes in the first position having the plane defined by the leading and trailing edges extending radially from the axis of rotation of the shaft with the trailing edge nearest said axis of rotation; and means controlling the rate of rotation of the vanes about their own axis of rotation in the one direction going from the second position to the first position, said means controlling the rate of rotation including a piston and cylinder connected between each vane and the frame member, the movement of the piston in the cylinder displacing a fluid to restrict the movement of the piston, said controlling means including means for adjusting the rate of rotation in said one direction to approximately half the rate of rotation of the rotating frame member, whereby each vane rotates the 135 degrees between the second position and first position about its axis of rotation in the same time that the frame member rotates through 270 degrees;

said means for adjusting the rate of rotation of the vanes including a flow meter for sensing changes in the velocity of the stream, means for rotating the flow meter with changes in direction of the stream of water, and means responsive to the flow meter for adjusting the restriction to fluid flow out of the cylinder by the piston.

* * * * *

UNITED STATES PATENT AND TRADEMARK OFFICE

CERTIFICATE OF CORRECTION

PATENT NO. : 4,551,066

DATED : November 5, 1985

INVENTOR(S) : James O. Frisz

It is certified that error appears in the above-identified patent and that said Letters Patent is hereby corrected as shown below:

The title page should be deleted to appear as per attached title page..

The sheets of Drawings consisting of Figs. 1-8 should be deleted to appear as per attached sheets.

Signed and Sealed this

*First* Day of *April 1986*

[SEAL]

*Attest:*

DONALD J. QUIGG

*Attesting Officer* *Commissioner of Patents and Trademarks*

United States Patent [19]
Frisz

[11] Patent Number: 4,551,066
[45] Date of Patent: Nov. 5, 1985

[54] SUBMERGED WATER WHEEL

[76] Inventor: James O. Frisz, 921 Pear St., Brea, Calif. 92621

[21] Appl. No.: 473,001

[22] Filed: Mar. 7, 1983

[51] Int. Cl.[4] .......... F03D 7/06; F03B 7/00
[52] U.S. Cl. .......... 416/119; 416/140; 416/41
[58] Field of Search .......... 416/84–86, 416/111, 119, 140 R, 41 R

[56] References Cited

U.S. PATENT DOCUMENTS

| | | | |
|---|---|---|---|
| 1,017,409 | 2/1912 | Granger | 416/86 |
| 1,582,361 | 4/1926 | Welsch | 416/DIG. 8 X |
| 4,052,134 | 10/1977 | Rumsey | 416/140 R X |
| 4,365,934 | 12/1982 | Mason | 416/197 A X |
| 4,368,392 | 1/1983 | Drees | 416/DIG. 8 X |
| 4,378,198 | 3/1983 | Pettersson | 416/140 R |

FOREIGN PATENT DOCUMENTS

| | | | |
|---|---|---|---|
| 1118687 | 2/1982 | Canada | 416/140 R |
| 2426813 | 1/1980 | France | 416/140 R |
| 2500076 | 8/1982 | France | 416/117 |
| 14870 | 2/1981 | Japan | 416/119 |
| 301091 | 12/1930 | United Kingdom | 416/119 |
| 709201 | 5/1954 | United Kingdom | 416/119 |

*Primary Examiner*—Everette A. Powell, Jr.

[57] ABSTRACT

A water wheel for operating fully submerged in an ocean current has a rotating frame member supported on the ocean floor for rotation about a vertical axis. The frame member supports a plurality of vertically extending vanes, each vane being rotatably supported on the frame for limited rotation about a vertical axis. It has a hydrofoil shape in cross-section with the axis of rotation parallel to the leading and trailing edges. Rotation of the vanes is limited relative to the frame by a hydraulic piston control system and shock absorbers.

1 Claim, 3 Drawing Figures

Fig. 2

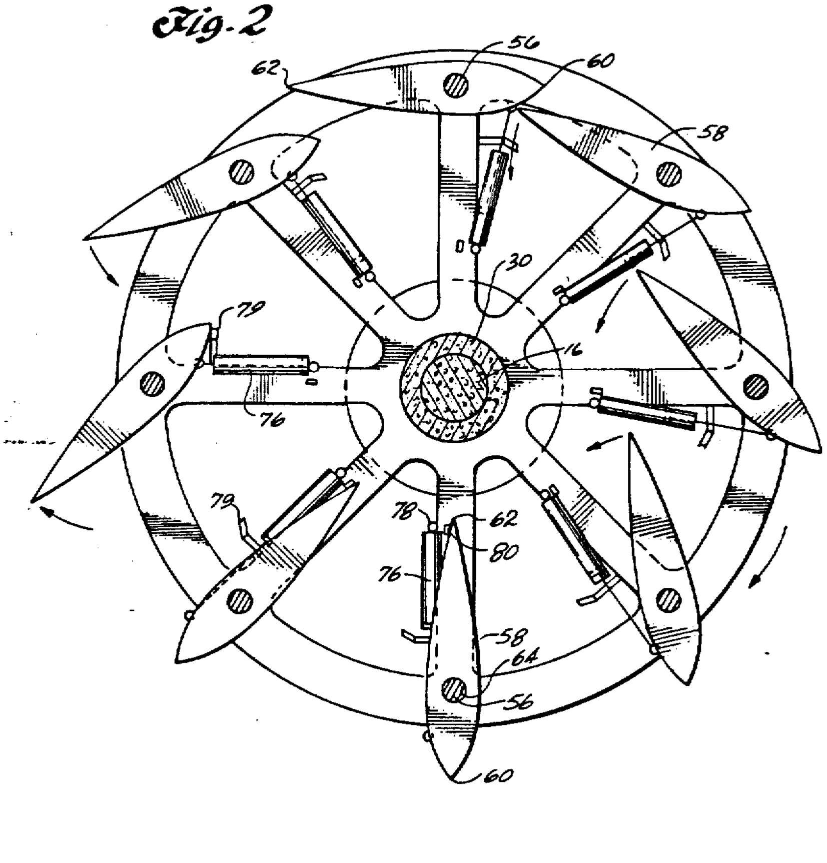

Fig. 2
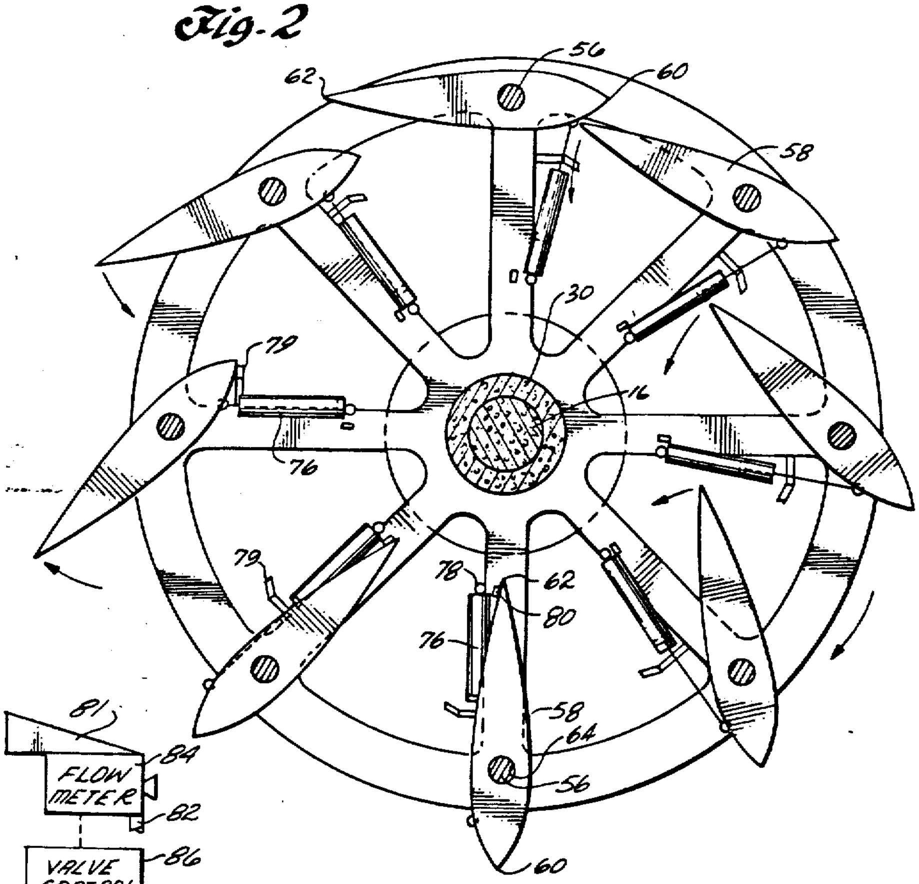
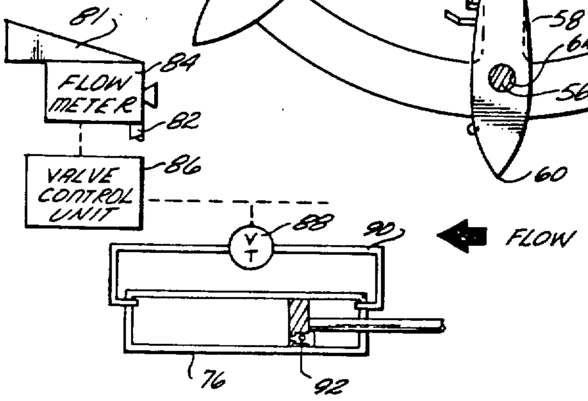
Fig. 3